(12) United States Patent
Gentry

(10) Patent No.: US 7,703,415 B2
(45) Date of Patent: Apr. 27, 2010

(54) RODEO RELEASE CHUTE APPARATUS

(75) Inventor: Paul Denny Gentry, Albuquerque, NM (US)

(73) Assignee: Priefert Manufacturing Compayny, Inc., Mt. Pleasant, TX (US)

( * ) Notice: Subject to any disclaimer, the term of this patent is extended or adjusted under 35 U.S.C. 154(b) by 347 days.

(21) Appl. No.: 11/703,865

(22) Filed: Feb. 8, 2007

(65) Prior Publication Data

US 2007/0199520 A1    Aug. 30, 2007

Related U.S. Application Data

(60) Provisional application No. 60/771,343, filed on Feb. 8, 2006.

(51) Int. Cl.
*A01K 1/00* (2006.01)
*A63K 1/00* (2006.01)

(52) U.S. Cl. .................... 119/427; 119/423; 49/25

(58) Field of Classification Search ............... 119/518, 119/524, 422–424, 426, 522, 839, 427, 502; 472/85–87; 49/25

See application file for complete search history.

(56) References Cited

U.S. PATENT DOCUMENTS

| 1,870,768 | A | * | 8/1932 | Comfort et al. | 119/426 |
| 2,012,186 | A | * | 8/1935 | Fihe | 119/426 |
| 2,319,420 | A | * | 5/1943 | Macksoud | 119/426 |
| 2,560,116 | A | * | 7/1951 | Lucas | 119/422 |
| 2,714,367 | A | * | 8/1955 | Arnold | 119/522 |

* cited by examiner

*Primary Examiner*—Rob Swiatek
*Assistant Examiner*—Kristen C Hayes
(74) *Attorney, Agent, or Firm*—Kent A. Herink; Emily E. Harris

(57) ABSTRACT

An animal release chute for use in steer or calf roping competitions is described. The chute has a fixed section and a moveable section that telescopes forwardly relative to the fixed section. A release gate at the forward end of the moveable section is moveable between a closed position for retaining a steer or calf inside the chute and an open position releasing the steer or calf from the chute. A sensor at the rearward end of the fixed section senses the presence of the horse of the roper at the rearward end of the fixed section. Only when the roper's horse is at the rearward end of the fixed section can the gate be released to release the calf. The chute system assures that there is always the fixed, predetermined distance between the calf and the roper at release.

7 Claims, 6 Drawing Sheets

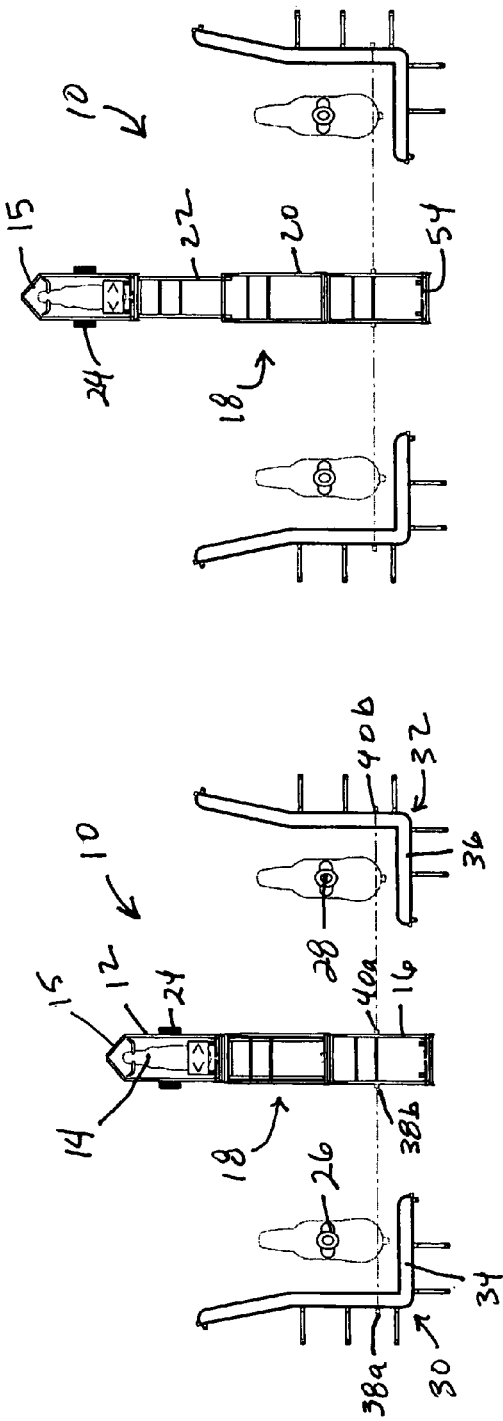
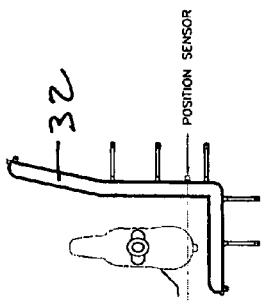
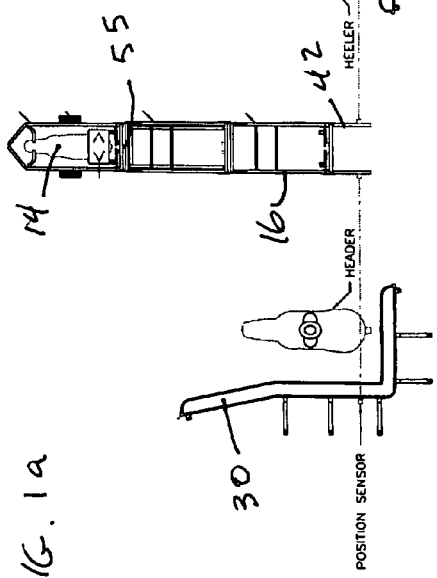

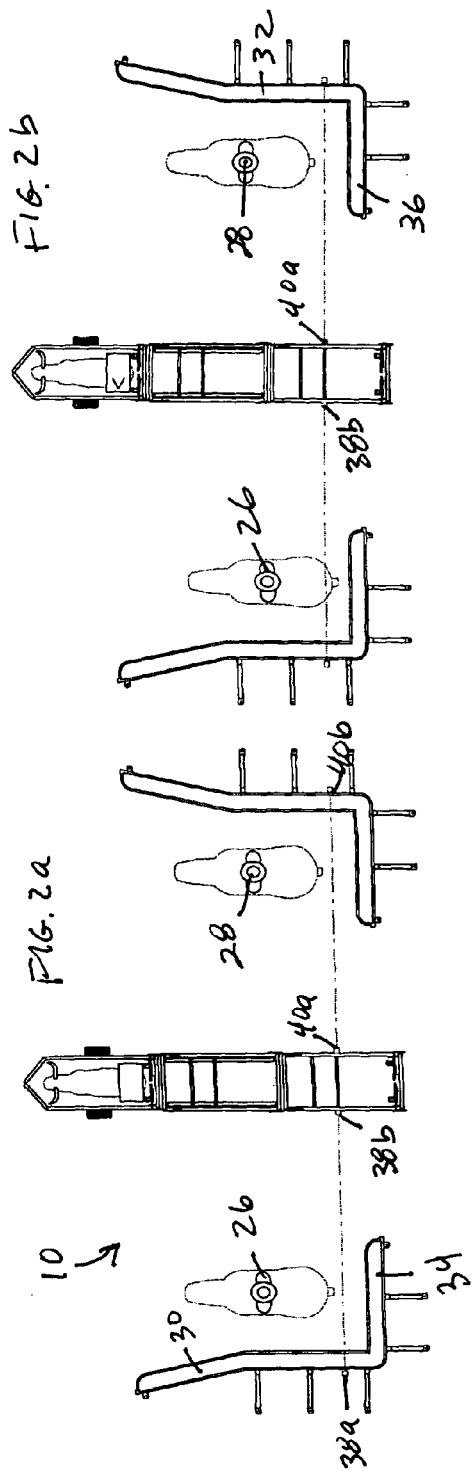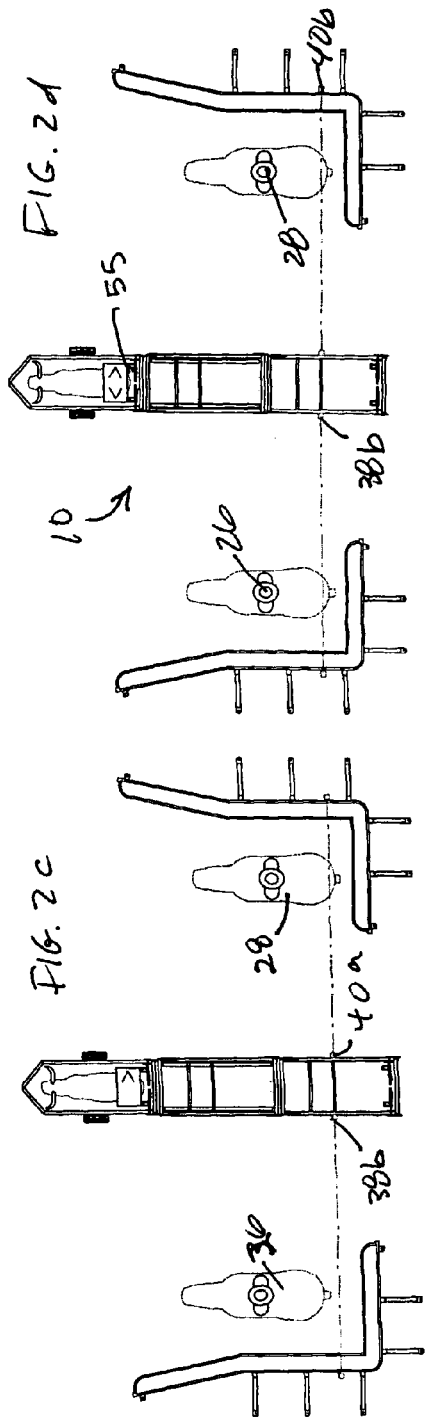

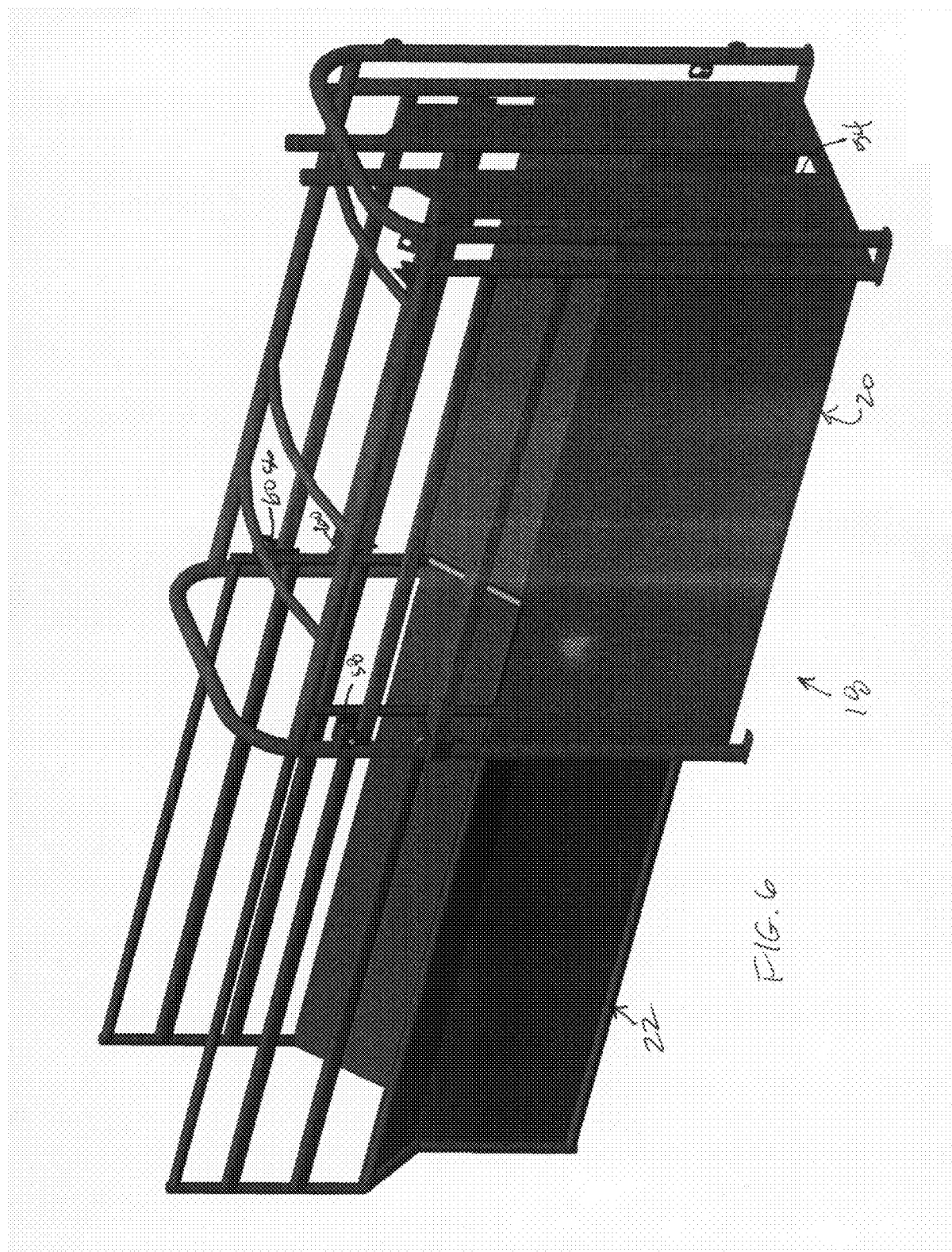

RODEO RELEASE CHUTE APPARATUS

This invention claims priority to U.S. Provisional Patent Application Ser. No. 60/771,343, filed Feb. 8, 2006.

BACKGROUND OF THE INVENTION

The invention relates generally to apparatus for use in rodeo events and, more particularly, to apparatus for timing the release of a calf in a calf roping event in a rodeo which assures that the calf is released the same distance from a rider every time.

Through the progression of the sport of rodeo it became obvious that timed-events involving cattle required that the animal be given a "head-start." Beginning in 1950 and subsequently during the next fifty-plus years, various techniques were devised to give the animals in timed rodeo events (steer wrestling, team roping, steer tripping, and tie-down calf roping) a head start. All of these techniques originated from the idea that some type of barrier, for example, a rope, wand or electric eye, be placed at the front of a starting box containing the horse, and that barrier be released by some technique, for example, rope, lever or electric eye, when the animal to be chased reached a predetermined "head start" distance.

There was really no clear reason, other than established practice, why these types of techniques were utilized in various applications through the years. Unfortunately, in an era when most rodeo athletes compete at near par physically, the outcome of decades of utilization of these barrier techniques resulted in winners being determined by their ability to anticipate or navigate the "head-start." In other words, those with a better mastery of the head-start technique could win more often than those with less mastery of the head-start technique. In the view of many, when a starting technique is more of a determining factor in winning than the athletic ability of the competitor, the purity of competition is lost. Therefore, a solution is needed.

SUMMARY OF THE INVENTION

According to the present invention, rodeo livestock are placed at the desired head-start distance with the use of a telescoping chute. The chute holds the livestock animal that is the target of a rodeo competitor and is closed by a gate that is opened by a chute release button under control of a controller that is in communication with other components of the preferred embodiments to assure correct positioning of the competitors. A pair of roping boxes are positioned on either side of the chute. Electric eyes are placed in the back of each of the roping boxes. Through the use of the controller which, in the preferred embodiment is in wireless communication with the electric eyes, the target animal will not be allowed to leave the chute unless the rear end of the horse or each rodeo competitor is breaking the electric eye beam in the back of the roping box. The present invention thus forces the rodeo competitor to place and hold the horse in the back of the roping or starting box, so that when the chute release button is operated, the rodeo competitors and horses are released simultaneously with the release of the target animal to be pursued. The present invention thus accomplishes the two purposes of giving the target animal the desired head start by adjustment of the length of the telescoping chute, and every rodeo competitor will have exactly the same head start. The competition once again becomes a competition of animals and athletic endeavor, with no deference to starting judgment or technique.

One implication of use of the present invention is that faster horses will probably become more valuable. However, if a horse will not hold in the box until all is set, a false start penalty could apply. The present invention will also create parity, which, hypothetically, could be dealt with by implementing time penalties for necking or half-heading a steer.

Currently, when a team backs into the box, one of three things can happen: The first is a perfect start, which does not happen very often; second, they can be late and get out-run; or third, they can break the barrier. A broken barrier is basically a no time. Using the chute system of the present invention, the only negative thing that might happen is a steer sliding back in the box or turning his head just as the header calls for him. But rather than that being a negative for the ropers, it is a positive.

BRIEF DESCRIPTION OF THE DRAWINGS

FIGS. 1a-c are plan views of a preferred embodiment of the present invention in three different configurations of a telescoping roping chute and roping boxes: Showing in FIG. 1a, the telescoping roping chute fully closed or retracted; showing in FIG. 1b, the telescoping roping chute fully extended; and showing in FIG. 1c, the telescoping roping chute fully retracted and the roping boxes moved back relative to the roping chute.

FIGS. 2a-d are plan views of a preferred embodiment of the present invention in the four different configurations: Showing in FIG. 2a, neither the header or heeler horse is positioned in the back of its roping box and the roping chute will not open; showing in FIG. 2b, the header horse is positioned in the back of its roping box, but the heeler horse is not and the roping chute will not open; showing in FIG. 2c, the heeler horse is positioned in the back of its roping box, but the header horse is not and the roping chute will not open; and showing in FIG. 2d, both the header and heeler horses are positioned in the back of their roping boxes and the roping chute will be allowed to open.

FIG. 6 is a rearward, perspective view of the telescoping section of the roping chute in its extended condition.

DETAILED DESCRIPTION OF THE PREFERRED EMBODIMENTS

Figure 3:
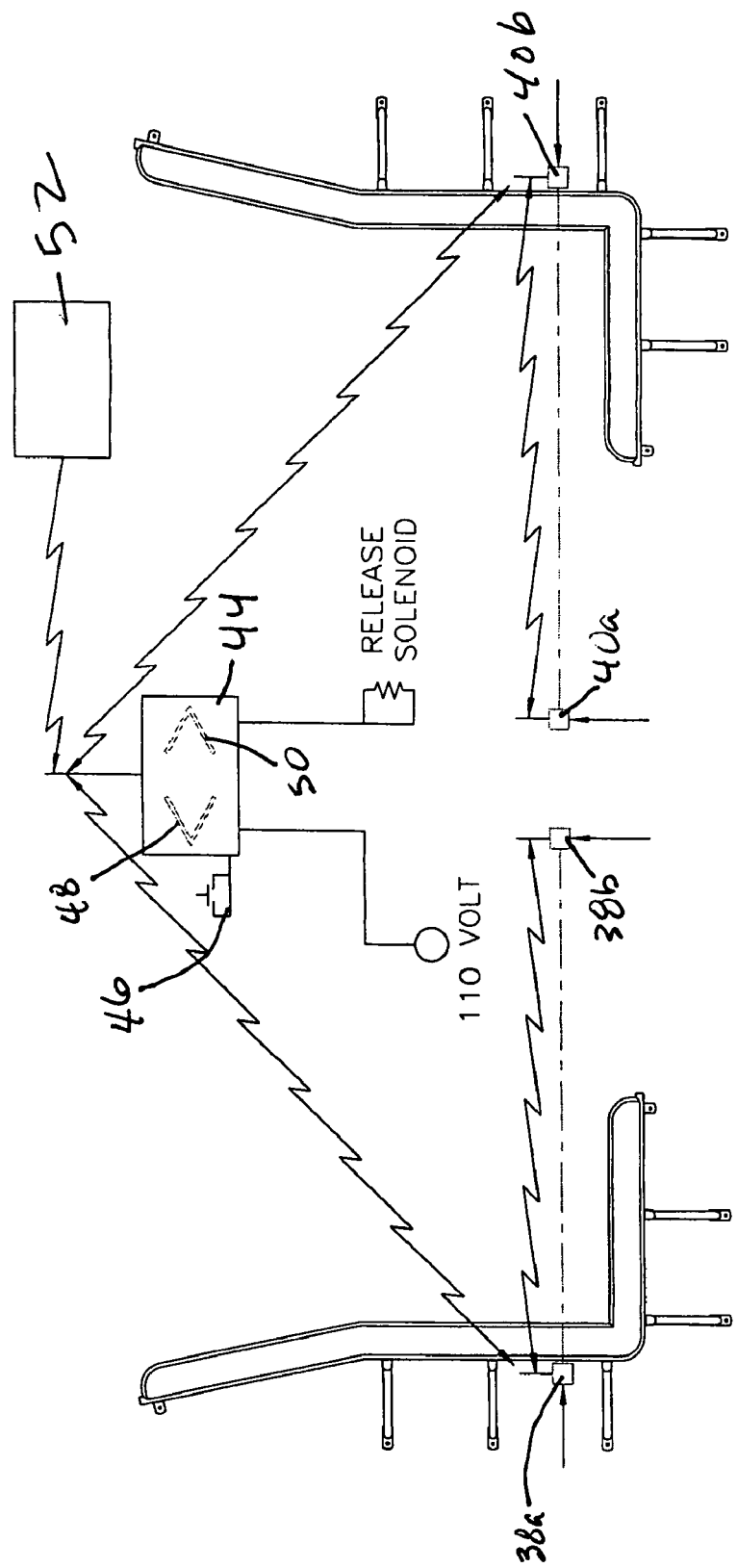
FIG. 3 is a schematic diagram of the electronic control circuitry of a preferred embodiment of the present invention.

Referring to FIG. 1, a preferred embodiment of the invention consists of a chute system 10 which is comprised of three principal sections, a front animal chute 12 which holds a target animal 14, or animals, in the "on deck" position, and a fixed rear section 16 that is secured to the ground, and a central telescoping lead-up section 18 interconnected between the front animal chute 12 and the fixed rear section 16. The telescoping section 18 includes a fixed rear section 20 and a telescoping, extendible and retractable front section 22 that is moveable between a retracted or closed position (FIG. 1a) and an extended position (FIG. 1b). The chute 12 is mounted to the forward end portion of the front section 22 and is mounted on wheels 24 that support it above the ground for rolling movement forwardly and rearwardly. Accordingly, extension and retraction of the front section 22 of the telescoping lead-up section 18 will advance and retract the front animal chute 12. In a preferred embodiment, the front section 22 can then be adjusted relative to the rear section 20 in six-inch increments over a total working range of five feet. The telescoping section 18 can be retrofitted to existing alley set-ups.

The preferred embodiment illustrated in FIG. 1 describes an embodiment of the present invention in which two rodeo competitors, commonly referred to as a header and a heeler, are mounted on horses and participate in a rodeo event involving the target animal 14. The header horse and rider 26 is the competitor on the left of the chute 10 and the heeler horse and rider 28 is the competitor on the right of the chute 10. Each competitor 26 and 28 is positioned generally within a corresponding roping box 30 and 32, respectively. A butt bar 34 and 36 defines the rear of the roping boxes 30 and 32, respectively. Cooperating pairs of sensors 38a and 38b are mounted on the left roping box 30 and the left side of the fixed rear section 16, and pairs of sensors 40a and 40b are mounted on the right roping box 32 and right side of the fixed rear section 16. In a preferred embodiment, the sensors 38 and 40 are a set of so-called electric eyes that are in an "open" state if there is no occluding object interposed between the pair of sensors and are in a "closed" state if an occluding object prevents the sensors from "seeing" each other. The sensors 38 and 40 are mounted proximate to the butt bars 34 and 36, respectively, and so sensors 38 will be "closed" when the header horse 26 is properly positioned near the butt bar 34 and sensors 40 will be "closed" when the heeler horse 28 is properly positioned near the butt bar 36.

In another preferred embodiment, the fixed rear section 16 is provided with a rearwardly extendible extension 42 (FIG. 1c) that serves to extend the length of the chute system 10 and thereby increase the lead or distance between the competitors 26 and 28 and the target animal 14.

It will be appreciated that there are four possible configurations of the competitors 26 and 28 relative to the sensors 38 and 40. One configuration is when neither competitor horse 26 or 28 is sufficiently close to the corresponding butt bar 34 or 36 to occlude the sensors 38 or 40, respectively (FIG. 2a). Another configuration is when the header competitor horse 26 is in the proper position occluding sensors 38, but the heeler competitor horse 28 is forward of the proper position (FIG. 2b). A third configuration is when the header competitor horse 26 is forward of the proper position, but the heeler competitor horse 28 is in the proper position occluding sensors 40 (FIG. 2c). The fourth configuration is when both competitor horses 26 and 28 are in proper position, occluding both pairs of sensors 38 and 40, respectively (FIG. 2d). Only when both competitor horses 26 and 28 are in proper position, occluding both pairs of sensors 38 and 40, respectively, should the target animal 14 be released by opening of a release gate 15 at the front of the animal control chute 12.

Control of the release of the animal 14 from the animal control chute 12 only under the proper conditions is accomplished by a control system, a preferred embodiment of which is illustrated in FIG. 3. The sensors 38 and 40 are each equipped with a wireless communication device that transmits its "open" or "closed" condition to a controller 44 that is mounted on and controls the opening of the front animal chute 12 (FIGS. 1 and 3). The controller 44 is configured such that it will only open the release gate 15 of the front animal chute 12 when a release button 46 is held in the closed position and when both sensors 38 and 40 are in the "closed" condition indicating that both the header competitor horse 26 and heeler competitor horse 28 are in the proper position. In the preferred embodiment, a pair of indicator lights 48 and 50 are displayed on the top of the controller 44 and are illuminated when the corresponding rodeo competitor 26, 28 is in the proper position (FIGS. 2a-d). Optionally, a timer 52 is in communication with the controller 44 and starts timing of the rodeo event upon opening of the release gate 15 and thus release of the animal 14.

While the preferred embodiments illustrated in the figures describe the invention with respect to a rodeo event involving two competitors, the present invention can easily be adapted for use with a single competitor on one side of the chute 10. One method would be to put a mask or cover over one of the pair of sensors associated with the missing competitor. Another method would be to simply modify the controller so that responds to a single pair of sensors and releases the animal 14 when that pair is in the "closed" condition.

Figure 4:
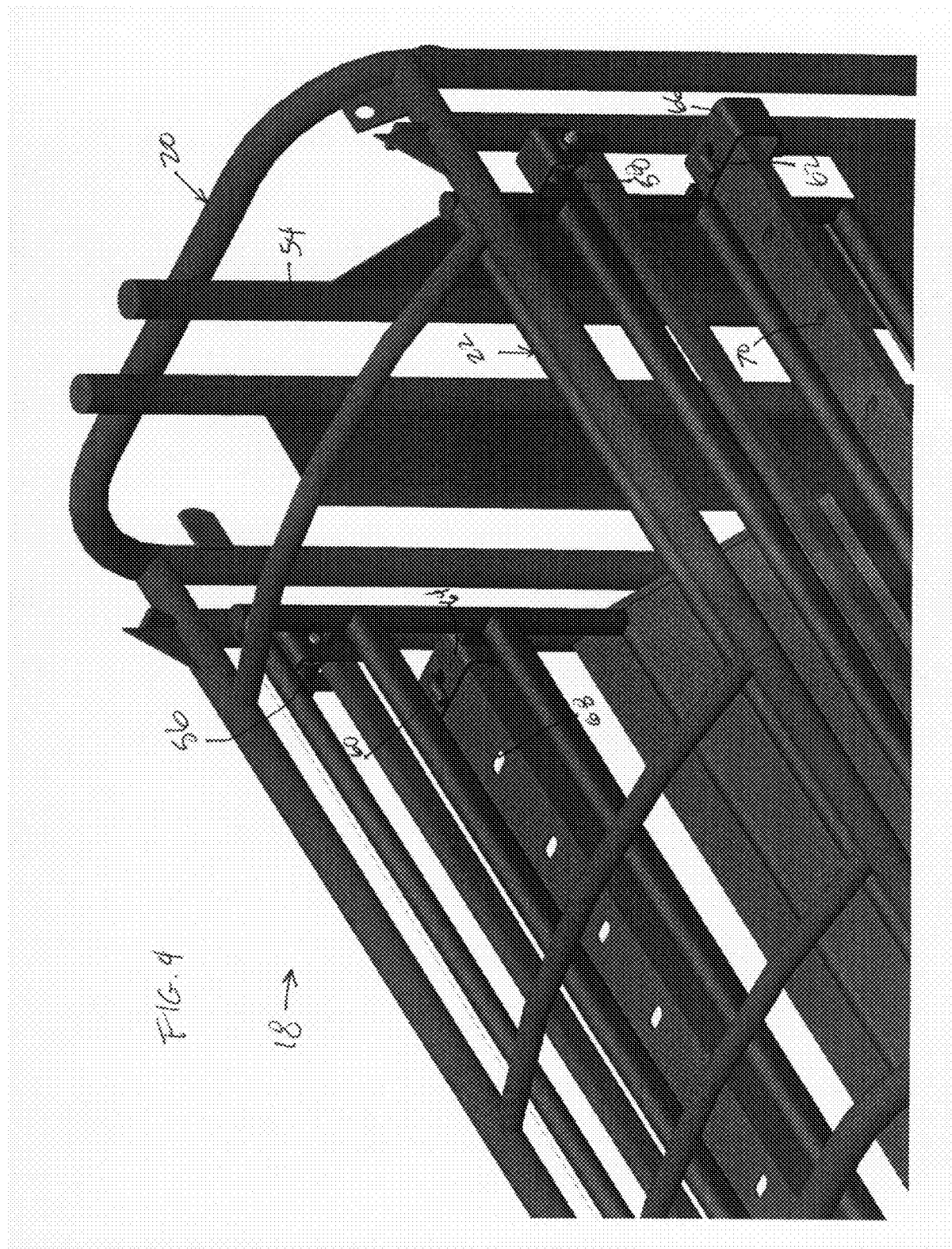
FIG. 4 is an enlarged, forward upper perspective view of the rearward end portion of the telescoping section of the roping chute in its retracted condition.
Figure 5:
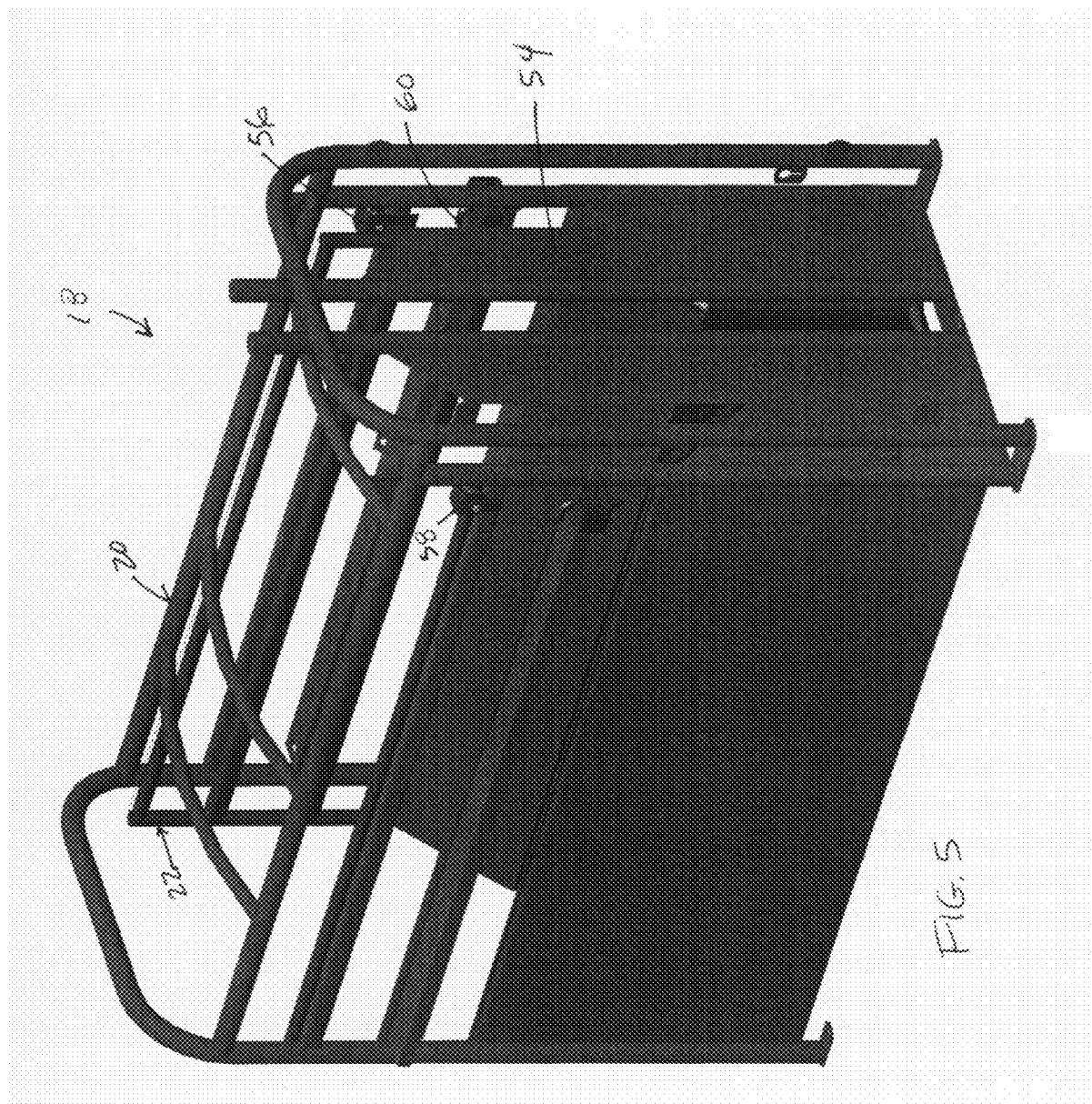
FIG. 5 is a rearward, perspective view of the telescoping section corresponding to FIG. 4.

A preferred embodiment of the structure of the central telescoping lead-up section 18 is illustrated in FIGS. 4-6. The rearward end portion of the fixed rear section 16 includes a gate 54 that is opened to permit the target animal 14 to enter the telescoping section 18 and proceed into the front animal chute 12. A gate 55 between the front animal chute 12 and the forward, extendible section 22 is then closed to prevent the target animal 14 from backing out of the front animal chute 12. The forward, extendible section 22 is supported for rolling movement on the fixed rear section 20 by a pair of rollers 56 and 58 so that it may be easily manually extended and retracted. Upon adjusting the length of the central section 16 to the desired length, the extendible section 22 is secured against undesired extension or retraction by a pair of pins 60 and 62 mounted in a corresponding bracket 64, 66 of the extendible section 22 that are dropped into a pair of corresponding openings 68, 70 of the fixed rear section 20. A plurality of the openings are spaced at regular intervals, which is six inches in the preferred embodiment, to permit adjustment of the length of the chute section 18 to any of the pairs of openings.

To summarize the operation of a preferred embodiment of the present invention, when both the header 26 and heeler 28 horses are backed into the their respective roping box 30, 32, each breaking their respective beam from the sensors 38, 40, both lights 48, 50 will illuminate. In order for the release gate 15 to be opened and steer or animal 14 to be released, the head and heel horses 26, 28 must be breaking the beams from their respective electronic eyes 38, 40. At that moment, the header 26 can call for his steer, the button 46 will be pushed and all involved are released: steer 14, header 26 and heeler 28. In this system, everything starts from a standstill and other than the chute gate 15 opening, there is no mechanical apparatus involved.

The perfect start is afforded to every roper. Additionally, the present invention completely eliminates the break out penalty. No one can ever break out because the chute won't open unless both ropers are backed completely into the box, breaking the beam of the electronic eye.

The telescoping chute aspect is important so different score lengths can be set for different talent levels as well as arena sizes. For higher-numbered ropers, the chute would be placed further out, while the less advanced ropers would start with the steer closer.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. An animal release chute apparatus, comprising:
   (a) a chute having a forward end section and a rearward end section;
   (b) a release gate at the forward end section of the chute moveable between a closed position for retaining a first target animal inside the chute and an open position releasing the first animal from the chute;
   (c) a sensor at the rearward end section of the chute for sensing the presence of a second animal at a preselected position adjacent the rearward end section; and
   (d) control apparatus operable to open the release gate only when the sensor senses the presence of the second animal at the preselected position.

2. An animal release chute apparatus as defined in claim 1, further comprising the chute having a fixed section and a moveable section that telescopes forwardly relative to the fixed section to one or more selected adjustable lengths.

3. An animal release chute apparatus as defined in claim 1, further comprising a roping box adjacent the rearward end section for providing a barrier to prevent the second animal from backing beyond a preselected distance behind the rearward end section.

4. An animal release chute apparatus as defined in claim 1, further comprising a second sensor at the rearward section for sensing the presence of a third animal at the preselected position, and wherein the control apparatus is operable to open the release gate only when the second sensor senses the presence of both the second animal and the third animal simultaneously at the preselected position.

5. An animal release chute apparatus for controlling the start of a rodeo event, comprising:
   (a) a chute having a forward end section and a rearward end section;
   (b) a release gate at the forward end section of the chute moveable between a closed position for retaining a target animal inside the chute and an open position releasing the target animal from the chute;
   (c) a sensor at the rearward end section of the chute for sensing the presence of a mounted rodeo competitor at a preselected position adjacent the rearward end section;
   (d) a roping box adjacent the rearward end section for providing a barrier to prevent the mounted rodeo competitor from backing beyond a preselected distance behind the rearward end section; and
   (e) control apparatus operable to open the release gate only when the sensor senses the presence of the mounted rodeo competitor at the preselected position.

6. An animal release chute apparatus as defined in claim 5, wherein the chute is extensible and retractable to a plurality of adjusted lengths so as to adjust the distance separating the target animal and the mounted rodeo competitor at release.

7. An animal release chute apparatus as defined in claim 5, further comprising
   (a) a second sensor at the rearward end section of the chute for sensing the presence of a second mounted rodeo competitor at the preselected position adjacent the rearward end section;
   (b) a second roping box opposite the first roping box and adjacent the rearward end section for providing a barrier to prevent the mounted rodeo competitor from backing beyond a preselected distance behind the rearward end section; and
   (c) wherein the control apparatus is operable to open the release gate only when both the first sensors senses the presence of the first mounted rodeo competitor at the preselected position and the second sensors senses the presence of the second mounted rodeo competitor at the preselected position.

* * * * *